Figure 1:
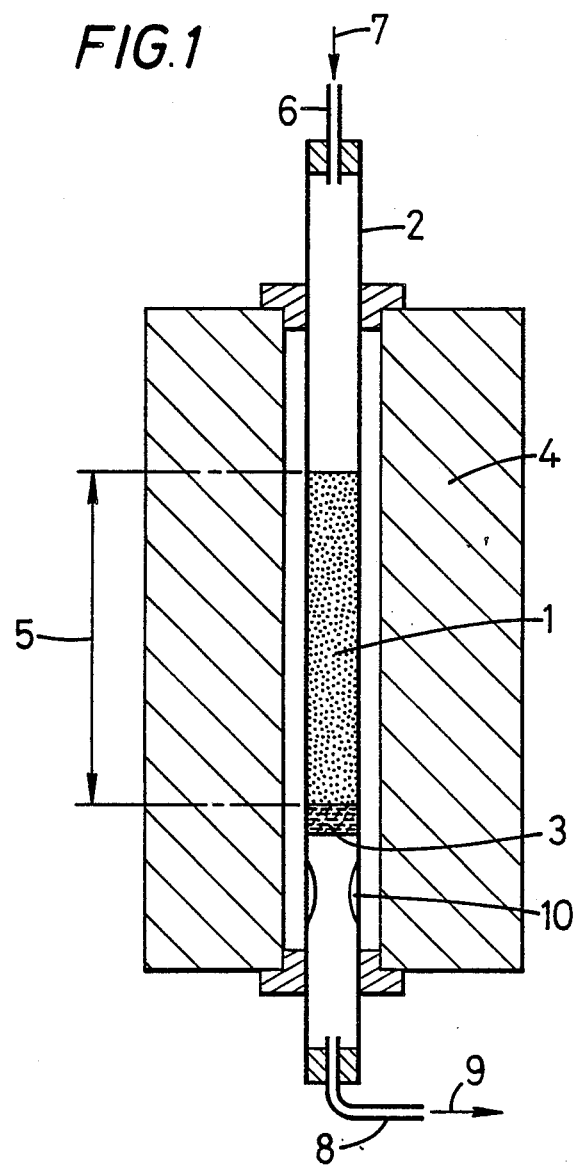

United States Patent [19]

Gimzeski

[11] Patent Number: 4,913,736
[45] Date of Patent: Apr. 3, 1990

[54] PROCESS FOR RECOVERING PLATINUM GROUP METALS

[75] Inventor: Edmund Gimzeski, London, England

[73] Assignee: The British Petroleum Company p.l.c., London, England

[21] Appl. No.: 259,567

[22] PCT Filed: Feb. 11, 1988

[86] PCT No.: PCT/GB88/00086

§ 371 Date: Oct. 11, 1988

§ 102(e) Date: Oct. 11, 1988

[87] PCT Pub. No.: WO88/06192

PCT Pub. Date: Aug. 25, 1988

[30] Foreign Application Priority Data

Feb. 13, 1987 [GB] United Kingdom ............ 8703323

[51] Int. Cl.$^4$ .................................................. C22B 11/02
[52] U.S. Cl. ............................................ 75/631; 423/22;
    423/200; 423/203; 423/207; 423/209; 502/34;
    502/56; 502/516; 502/518; 75/426
[58] Field of Search ................... 502/34, 56, 516, 518;
    75/63, 66, 83, 89, 90 R; 423/22, 200, 203, 207,
    209

[56] References Cited

U.S. PATENT DOCUMENTS 3,206,413  9/1965  Leopard ........................ 502/38
3,542,863  11/1970  Zimmerscheid ................ 502/28
4,142,993  3/1979  Elofson et al. ................ 252/447

FOREIGN PATENT DOCUMENTS 0120655  3/1984  European Pat. Off.
1479886  3/1967  France .
1518305  4/1967  France ......................... 423/22
0044998  8/1973  Japan .......................... 423/22
60-003864  1/1985  Japan .
0869354  7/1983  U.S.S.R. ....................... 423/200
795629  5/1958  United Kingdom .
798712  7/1958  United Kingdom .......... 423/22
1565074A  4/1980  United Kingdom .
85/00834  8/1984  World Int. Prop. O. .

OTHER PUBLICATIONS

Yasakatsu Tamai et al., Carbon, vol. 15, pp. 103-106, 1977.

Primary Examiner—Robert L. Stoll
Attorney, Agent, or Firm—Larry W. Evans; Joseph G. Curatolo; Teresan W. Gilbert

[57] ABSTRACT

A process for recovering Platinum Group metals from material comprising one or more Platinum Group metals and one or more Group IA metals supported on carbon comprises heating at a temperature between 700° C. and 1150° C. in a stream of an inert gas or vacuum then in a stream of carbon dioxide.

7 Claims, 1 Drawing Sheet

PROCESS FOR RECOVERING PLATINUM GROUP METALS

The present invention relates to the recovery of metals from carbon-supported materials and more particularly relates to the recovery of Platinum Group metals from carbon-supported materials.

Many catalytic materials comprise a supporting medium carrying a metal or metal compound. When a catalyst is no longer effective in a reaction process, it is often desirable to recover the metal or metal compound. This is particularly the case for relatively precious metals.

A catalyst for the synthesis of ammonia from nitrogen and hydrogen comprises ruthenium and caesium supported on carbon. It is economically advantageous to recover metals from the spent catalyst material. However, known techniques are sometimes unsatisfactory in their ability to separate the components. The present invention relates to an improved process for the recovery of Platnium Group metals from carbon-supported materials.

Thus according to the present invention there is provided a process for recovering Platinum Group metals from material comprising one or more Platinum Group metals and one or more Group IA metals supported on carbon, the process comprising the steps:

(a) heating the material in a stream of an inert gas or in a vacuum at a temperature between 700° C. and 1150° C. to remove a major proportion of the Group IA metals.

(b) heating the resultant residue from step (a) in a stream of carbon dioxide at a temperature between 70° C. and 1150° C. to remove the carbon and further Group IA metals and (c) treating the resultant residue from step (b) by conventional means to recover the Platinum Group metals.

By Platinum Group metals is meant one or more of the following metals: ruthenium, osmium, rhodium, iridium, palladium, platinum, silver and gold.

By Group IA metals is meant one or more of the following metals: lithium, sodium, potassium, rubidium and caesium. The material may be a catalyst material. Preferably, the material is a catalyst comprising ruthenium and caesium supported on carbon.

The most preferred temperature ranges for both steps (a) and (b) are 900° C. to 1100° C.

The process may be carried out in a vertical alumina reactor. The reactor is heated by a suitable source such as electrical coils or gas burners. The material is preferably in the form of pellets.

The inert gas is preferably nitrogen. The nitrogen and carbon dioxide may be preheated before being passed through the reactor.

The Group IA metals removed with the inert gas are preferably collected downstream of the material.

The resultant residue from step (b) is preferably washed with hydrochloric acid to yield Platinum Group metals and ash. The Platinum Group metals may then be recovered by conventional means.

The invention will now be described by way of example only and with reference to the drawing.

FIG. 1 represents, in cross-section, a vertical reactor for use in the process according to the present invention for the recovery of ruthenium and caesium from a catalyst material comprising ruthenium and caesium supported on carbon.

A catalyst material (1) was packed into a vertical alumina reactor (2). ICI Saffil wool (3) (95% alumina) was used as a base support for the catalyst material (1). The catalyst material (1) was in pellet form and comprised approximately 5% ruthenium and 25% caesium on a carbon support. The reactor (2) was capable of being heated by an electrical resistance furnace (4) having a hot zone (5) extending over the catalyst material (1). It is envisaged that other types of heater may be used, for example gas burners. The reactor (2) had a gas inlet (6) through which gases (7) could be introduced and an outlet (8) through which outlet gases (9) could be exhausted.

In the first step of the process, the reactor (2) containing the catalyst material (1) was heated to about 1000° C. by the furnace (4) and a stream of nitrogen was passed through the gas inlet (6) and downwardly through the catalyst material (1) in the reactor (2). Caesium was volatilised and condensed in the cooler parts (10) of the reactor (2) downstream of the catalyst material (1).

In the second step of the process, the residue from the first step was heated to about 1000° C. in the reactor (2) by the furnace (4) and carbon dioxide was passed through the gas inlet (6) and downwardly through the residue in the reactor (2). Further caesium was volatilised and again condensed in the cooler part (10) of the reactor (2) downstream of the residue from the first step of the process. The carbon support was also removed by the carbon dioxide during this step of the process by reaction to form carbon monoxide.

The residue from the second step was repeatedly washed with hydrochloric acid (1 molar) and centrifuged to yield ruthenium metal and ash. It is envisaged that the metal and ash may be further treated by conventional means to recover the ruthenium.

In some experiments the residue was further washed with hydrofluoric acid (20% solution).

In this example, the nitrogen and carbon dioxide gas streams were dried by molecular sieve before being introduced into the reactor.

The results from a series of experiments are given in Table 1. These show that the process according to the present invention gave a ruthenium recovery of at least 95%.

TABLE 1

RUTHENIUM RECOVERY EXPERIMENTS

| | Step (a) | | | Step (b) | | | Weight of material | | | |
|---|---|---|---|---|---|---|---|---|---|---|
| Run No. | Temperature (°C.) | Gas & Flow ($cm^3 min^{-1}$) | Duration (hours) | Temperature (°C.) | Gas & Flow ($cm^3 min^{-1}$) | Duration (hours) | Initial (g) | After Step (b) % of initial | After HCL wash % of initial | After HF wash % of initial | Ru Recovery % |
| 1 | 1100 | Nitrogen 500 | 5 | 1100 | $CO_2$ 500 | 5 | 50 | 13.3 | 5.65 | — | — |
| 2 | 1100 | Nitrogen | 5 | 1100 | $CO_2$ | 5 | 50 | 12.9 | 5.50 | — | 97.5 ± |

TABLE 1-continued

RUTHENIUM RECOVERY EXPERIMENTS

| | Step (a) | | | Step (b) | | | | Weight of material | | | |
|---|---|---|---|---|---|---|---|---|---|---|---|
| Run No. | Temperature (°C.) | Gas & Flow (cm³ min⁻¹) | Duration (hours) | Temperature (°C.) | Gas & Flow (cm³ min⁻¹) | Duration (hours) | Initial (g) | After Step (b) % of initial | After HCL wash % of initial | After HF wash % of initial | Ru Recovery % |
| 3 | 1100 | 500 Nitrogen 1500 | 6 | 1100 | 500 $CO_2$ 1500 | 6.5 | 200 | 14.9 | 5.50 | 5.45 | 98.5 ± 1.5 |
| 4 | 1000 | Nitrogen 1500 | 6.5 | 1100 | $CO_2$ 1500 | 6.5 | 200 | 15.5 | 5.25 | 5.20 | 96.5 ± 1.5 |
| 5 | 1100 | Nitrogen 1500 | 6 | 1000 | $CO_2$ 1500 | 6.5 | 200 | 16.9 | 5.55 | 5.50 | 101.5 ± 1.5 |
| 6 | 1000 | Nitrogen 1500 | 6.5 | 1000 | $CO_2$ 1500 | 6.5 | 200 | 19.2 | 5.65 | 5.55 | 100.0 ± 1.5 |
| 7 | 1100 | Nitrogen 1500 | 6 | 1100 | $CO_2$ 1500 | 6.5 | 200 | 13.9 | 5.35 | 5.30 | 97.0 ± 1.5 |

I claim:

1. A process for recovering Platinum Group metals from carbon supported catalyst material comprising one or more Platinum Group metals and one or more Group IA metals supported on carbon, the process comprising the steps (a) heating the material in a stream of an inert gas or in a vacuum at a temperature between 700° C. and 1150° C. to remove a major portion of the Group IA metals, and (b) heating the resultant residue from step (a) in a stream of carbon dioxide at a temperature between 700° C. and 1150° C. to remove the carbon and further Group IA metals.

2. A process for recovering Platinum Group metals according to claim 1 in which the Platinum Group metals comprise ruthenium.

3. A process for recovering Platinum Group metals according to claim 1 in which the Group IA metal is caesium.

4. A process for recovering Platinum Group metals according to claim 1 in which the inert gas is nitrogen.

5. A process for recovering Platinum Group metals according to claim 1 in which the temperature of step (a) is between 900° C. and 1100° C.

6. A process for recovering Platinum Group metals according to claim 1 in which the temperature of step (b) is between 900° C. and 1100° C.

7. A process for recovering Platinum Group metals according to claim 2 in which the Group IA metal is caesium.

* * * * *